United States Patent
Xie

(10) Patent No.: US 10,449,561 B2
(45) Date of Patent: Oct. 22, 2019

(54) WATER JET CONDENSER WITH MULTIPLE CLOSED WATER CHAMBERS AND JET REGULATING VALVE

(71) Applicant: Nanning Mast Sugar Machine Equipment Manufacturing Co., Ltd., Nanning, Guangxi (CN)

(72) Inventor: Ming Xie, Guangxi (CN)

(73) Assignee: NANNING MAST SUGAR MACHINE EQUIPMENT MANUFACTURING CO., LTD., Nanning (CN)

( * ) Notice: Subject to any disclaimer, the term of this patent is extended or adjusted under 35 U.S.C. 154(b) by 213 days.

(21) Appl. No.: 15/633,800

(22) Filed: Jun. 27, 2017

(65) Prior Publication Data

US 2017/0291179 A1    Oct. 12, 2017

Related U.S. Application Data

(63) Continuation of application No. PCT/CN2015/096715, filed on Dec. 8, 2015.

(30) Foreign Application Priority Data

Jan. 6, 2015 (CN) .......................... 2015 1 0003225

(51) Int. Cl.
  *B05B 1/30* (2006.01)
  *C13B 25/02* (2011.01)
  *F16K 3/03* (2006.01)
(52) U.S. Cl.
  CPC ............ *B05B 1/3026* (2013.01); *C13B 25/02* (2013.01); *F16K 3/03* (2013.01)

(58) Field of Classification Search
  CPC .......... B05B 1/3026; C13B 25/02; F16K 3/03
  USPC .................................... 261/49, 115, DIG. 10
  See application file for complete search history.

(56) References Cited

U.S. PATENT DOCUMENTS

| 2,389,005 | A | * | 11/1945 | Sebald | ...................... | F28B 3/00 |
|           |   |   |         |        |                        | 261/115   |
| 3,360,905 | A | * | 1/1968  | Aarnio | .................. | F22B 37/265 |
|           |   |   |         |        |                        | 261/115   |
| 4,094,492 | A | * | 6/1978  | Beeman | ..................... | F16K 3/03 |
|           |   |   |         |        |                        | 138/45    |
| 4,513,948 | A | * | 4/1985  | Konig  | ....................... | F16K 3/03 |
|           |   |   |         |        |                        | 251/212   |

(Continued)

*Primary Examiner* — Charles S Bushey
(74) *Attorney, Agent, or Firm* — Law Offices of Steven W. Weinrieb

(57) ABSTRACT

A water jet condenser with multiple closed water chambers and a jet flow adjusting valve used in a sugar refinery. A water chamber of the condenser is divided into an open large water chamber (6) and a plurality of closed small water chambers (14); each water chamber is respectively provided with a jet nozzle (3) and a spray nozzle (7); the plurality of closed small water chambers (14) are respectively controlled by a plurality of pneumatic or electric butterfly valves (4); the lower part of the condenser body (13) is provided with a single-layer or multi-layer jet flow regulating valve (2) for keeping the concentric change of the diameter of the central round aperture of a jet flow passage; the jet nozzle (3) and the spray nozzle (7) in each water chamber are respectively cooperated with the single-layer or multi-layer jet flow regulating valve (2).

5 Claims, 4 Drawing Sheets

(56) References Cited

U.S. PATENT DOCUMENTS

| | | | |
|---|---|---|---|
| 6,841,138 B2* | 1/2005 | Kumada | B01D 53/1412 |
| | | | 261/115 |
| 2011/0272492 A1* | 11/2011 | Simpson | B05B 1/14 |
| | | | 239/462 |
| 2011/0303864 A1* | 12/2011 | Lee | F16K 3/03 |
| | | | 251/337 |

* cited by examiner

WATER JET CONDENSER WITH MULTIPLE CLOSED WATER CHAMBERS AND JET REGULATING VALVE

CROSS-REFERENCE TO RELATED APPLICATIONS

The present application is a continuation application of PCT application No. PCT/CN2015/096715 filed on Dec. 8, 2015, which claims the benefit of Chinese Patent Application No. 201510003225.7 filed on Jan. 6, 2015, the contents of which are hereby incorporated by reference.

FIELD OF THE INVENTION

The present invention relates to a water jet condenser with multiple closed water chambers and a jet regulating valve, which is especially applicable to vacuum systems in light and chemical industries and pharmaceutical factories.

BACKGROUND OF THE INVENTION

Before 2005, wet-type water jet condensers commonly used in domestic sugar refineries are TDP-type water jet condensers. Since the Indian high-efficiency condenser was imported into China in 2005, sugar refineries in China followed to use such a condenser due to its obviously superior efficiency over that of a TDP-type water jet condenser. So far, most of sugar refineries from north to south in China are using this type of Indian high-efficiency condensers (including those imitated or improved by domestic factories). However, as having been used for nearly a decade, critical defects of this type of Indian high-efficiency condensers have been exposed gradually. For example, at the initial stage of grinding, most of these efficient condensers are high in vacuum degree, which can be within the range of 0.086 to 0.09 MPa, under the conditions of cold weather, low water temperature and stable quantity of steam treated. But when the production conditions change, for example, when the quantity of steam needing to be treated increases or sugar boiling time is shortened, or when a water feed temperature rises due to hot weather, the vacuum degree of a condenser will be seriously reduced to the range of 0.080 to 0.082 MPa, which does not meet the technological requirements of sugar boiling.

SUMMARY OF THE INVENTION

An objective of the present invention is to provide a novel water jet condenser with multiple closed water chambers and a jet regulating valve. Such a novel water jet condenser is not only capable of reaching a high vacuum degree under the production conditions of low water temperatures and a normal grinding quantity, but also capable of maintaining the vacuum degree above the technical requirement of 0.086 to 0.09 MPa even when the water temperature and the grinding quantity fluctuate within regulating ranges.

In order to solve the above problem, the present invention utilizes the following technical solutions: such a novel water jet condenser with multiple closed water chambers and a jet regulating valve includes a complete set of water jet condenser as shown in FIG. 1 and an automatic control device for the same. The complete set of condenser is divided into an internal body part and an external body part. A juice vapor inlet is formed in the top of the external body part. A water jetting cylinder is disposed in the middle of the body; a plurality of spray nozzles are distributed on an upper pipe plate of the water jetting cylinder, and a plurality of jet nozzles are distributed on a lower pipe plate; an inner cavity of the water jetting cylinder are divided by partition plates into a top-open large water chamber and a plurality of top-closed small water chambers; a plurality of spray nozzles and a plurality of jet nozzles are disposed on the parts, located in the large water chamber, of the upper and lower pipe plates, respectively; a plurality of jet nozzles are also disposed on the part, located in each closed small water chamber, of the lower pipe plate; the plurality of spray nozzles on the upper pipe plate are correspondingly connected to the closed small water chambers by means of small water pipes, respectively; water fed into all the closed small water chambers is controlled by the pneumatic or electric butterfly valves disposed on the plurality of branched water inlet pipes outside the condenser, respectively, and water fed into the large water chamber is controlled by a pneumatic butterfly valve disposed on the main water inlet pipe.

A single-layer or multi-layer jet regulating valve is connected to the cone bottom of the condenser, which has the following structures.

The valve body of the single-layer jet regulating valve may be designed to be internally composed of a rotatable circular-ring gear and a plurality of cambered thick metal blades overlapping each other. Unfolding and folding of the blades can change the diameter of a central circular hole. Rotation of the circular-ring gear may cause unfolding and folding of the blades to change the diameter of the central circular hole. The valve body (21) of the single-layer jet regulating valve may also be designed to be internally composed of a plurality of annular metal sheets overlapping each other. The shifting of the annular metal sheets overlapping each other can change the diameter of the central circular hole.

2 to 5 layers may be designed in the valve body of the multi-layer jet regulating valve; each layer is separated by a steel plate; 1 to 6 circular or circular-ring-shaped valve plates capable of sliding along the center are arranged in each layer of valve body; all the layers of circular or circular-ring-shaped valve plates form a central circular hole with a fixed diameter. Each circular or circular-ring-shaped valve plate is connected to a push rod extending out of the valve, and the push rod can be connected to a piston rod of an air cylinder and pushed by the air cylinder, or can be connected to a shaft rod of a motor and pushed by the motor, or can be connected to a screw and pushed by a gear or pushed manually.

The circular or circular-ring-shaped valve plates or the cambered thick metal blades of the single-layer or multi-layer jet regulating valve cooperate with the pneumatic or electric butterfly valves disposed on the branched water inlet pipes outside the condenser and the master pneumatic control inlet valve disposed on the main water inlet pipe in operation. The operations of the condenser are divided into a plurality of levels for control according to the quantity of water supplied into the water jetting cylinder of the condenser, and the control operations are designed into automatic control or manual control.

The present invention has the beneficial effects as follows:
1. High Vacuum Degree
The vacuum degree can be maintained above the range of 0.086 to 0.09 MPa in the whole production process.
2. Water Saving
Water may be saved by above 20% in contrast with various high-efficiency condensers used at present.

3. High Efficiency

The processing capability of the condenser may be improved by above 30% in contrast with various high-efficiency condensers used at present.

4. Improved Boiling House Recovery Rate

Since a stable high vacuum degree can be maintained in the whole production process, the condenser, when used for boiling sugar, is capable of increasing the boiling house recovery rate.

BRIEF DESCRIPTION OF THE DRAWINGS

The present invention will be further illustrated by combining with accompanying drawings and embodiment.

In FIG. 1, a tail pipe (1), a single-layer or multi-layer jet regulating valve (2), jet nozzles (3) for jetting downwards, pneumatic control inlet valves (4) for branched water inlet pipes, the branched water inlet pipes (5), an open large water chamber (6), spray nozzles (7) for jetting upwards, a water jetting cylinder (8), a branched water inlet pipe (9) for the large water chamber, a master pneumatic control inlet valve (10) for a main water inlet pipe, the main water inlet pipe (11), a two-layer filter vat (12), a condenser body (13), a plurality of closed small water chambers (14), and a cone-bottom hand hole (15) are indicated.

In FIG. 2, a valve body (16) of the single-layer or multi-layer jet regulating valve, 1 to 6 circular or circular-ring-shaped valve element plates (17) capable of sliding along the center, and push rods (18) are indicated.

In FIG. 3, a valve body (21) of the single-layer jet regulating valve, a rotatable circular-ring gear (20), and a plurality of cambered thick metal blades (19) overlapping each other are indicated.

In FIG. 4, the water jetting cylinder (8) of the condenser, one top-open large water chamber (6) and a plurality of top-closed small water chambers (14), the spray nozzles (7) on an upper pipe plate, the jet nozzles (3) on a lower pipe plate, and the branched water inlet pipes (5) are indicated.

DETAILED DESCRIPTION OF THE EMBODIMENT

Figure 1:
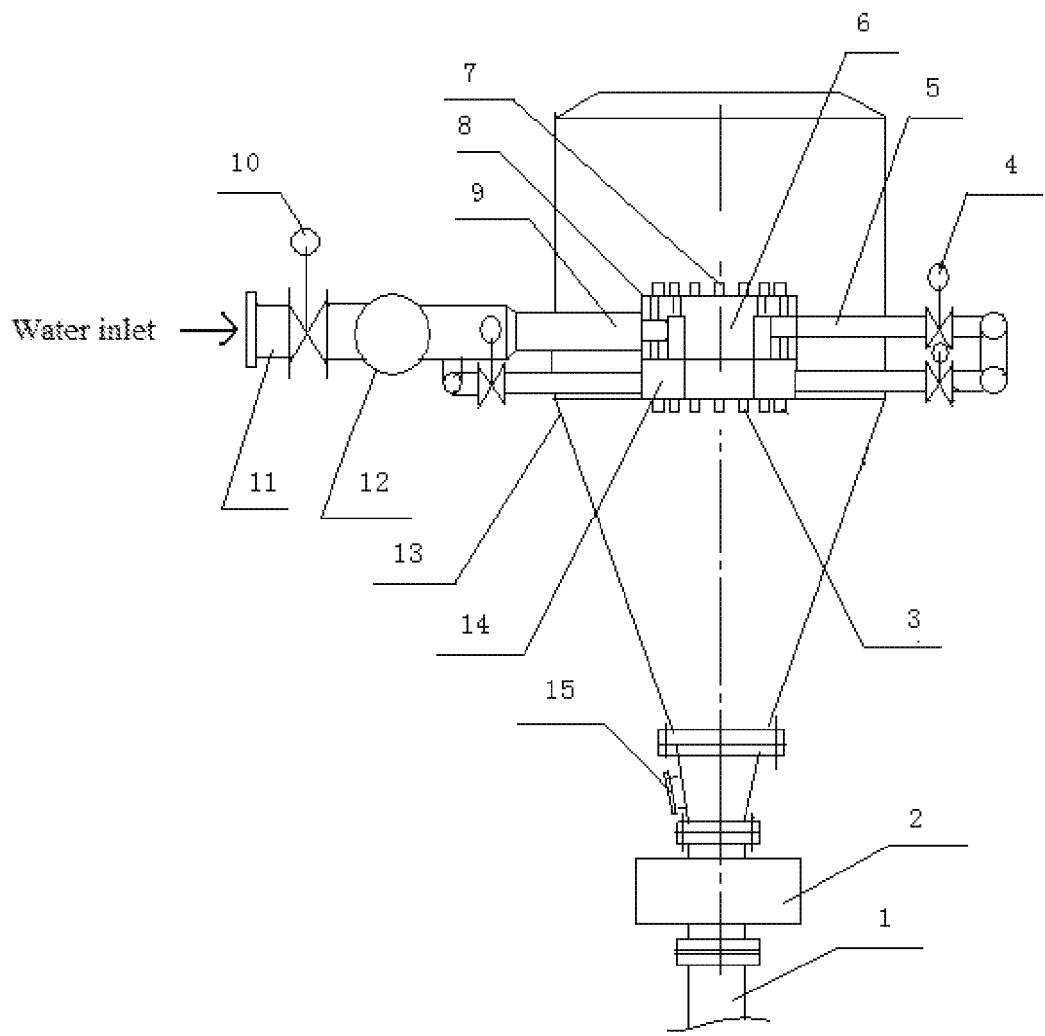
FIG. 1 is a structural schematic diagram of a novel water jet condenser with multiple closed water chambers and a jet regulating valve of the present invention.

FIG. 1 is the structural schematic diagram of the novel water jet condenser with multiple closed water chambers and the jet regulating valve of the present invention. In FIG. 1, a section view of the body (13) is displayed. In the figure, partition plates are disposed on a lower pipe plate within the water jetting cylinder (8) in the body (13) for division to form a top-open large water chamber (6) and a plurality of top-closed small water chambers (14). The top-open large water chamber (6) is supplied with water from a branched water inlet pipe (9), while the plurality of top-closed small water chambers (14) are supplied with water from a plurality of branched water inlet pipes (5), respectively. A pneumatic or electric butterfly valve (4) installed outside the condenser body is disposed on each branched water inlet pipe (5) to control water fed into the corresponding small water chamber (14). A plurality of spray nozzles (7) and a plurality of jet nozzles (3) are disposed on the parts, located in the large water chamber (6), of the upper and lower pipe plates, respectively. A plurality of jet nozzles (3) are also disposed on the part, located in each closed small water chamber (14), of the lower pipe plate. The plurality of spray nozzles (7) on the upper pipe plate are correspondingly connected to the closed small water chambers (14) by means of small water pipes, respectively.

The branched water inlet pipe (9) and the plurality of branched water inlet pipes (5) are connected to the main water inlet pipe (11), respectively. A two-layer filter vat (12) and a master pneumatic control inlet valve (10) are disposed on the main water inlet pipe (11). The main water inlet pipe (11) is connected to a water source.

A single-layer or multi-layer jet regulating valve (2) is connected to the cone bottom of the condenser. The single-layer or multi-layer jet regulating valve (2) in the present invention may be of a single-layer structure or a multi-layer structure, which will be illustrated below in conjunction with the accompanying drawings.

Figure 2:
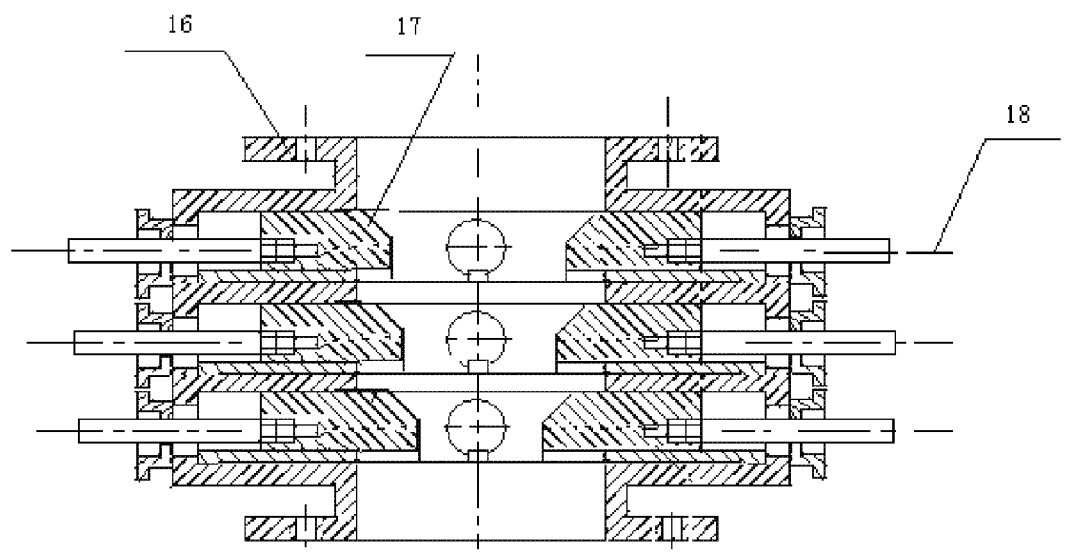
FIG. 2 is a structural schematic diagram of a multi-layer jet regulating valve of the present invention.

FIG. 2 is the structural schematic diagram of the multi-layer jet regulating valve of the present invention. A section view of a valve body (16) is displayed in FIG. 2. In the figure, 2 to 5 layers may be designed in the valve body; each layer is separated by a steel plate; 1 to 6 circular or circular-ring-shaped valve plates capable of sliding along the center are arranged in each layer of the valve body; all the layers of circular or circular-ring-shaped valve plates form a central circular hole with a fixed diameter. Each circular or circular-ring-shaped valve plate is connected to a push rod extending out of the valve, and the push rod can be connected to a piston rod of an air cylinder and pushed by the air cylinder, or can be connected to a shaft rod of a motor and pushed by the motor, or can be connected to a screw and pushed by a gear or pushed manually. 1 to 6 circular or circular-ring-shaped valve plates (17) capable of sliding along the center are simultaneously shifted inwards or outwards by a same distance under the action of the push rod (18) to form a central circular hole with a fixed diameter.

Figure 3:
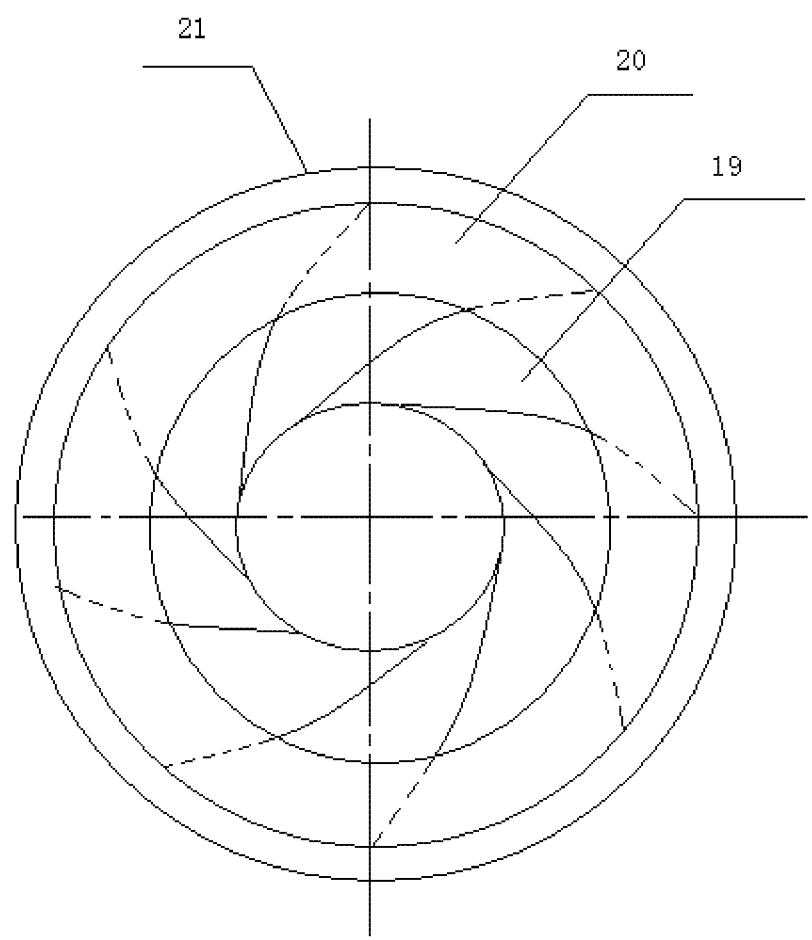
FIG. 3 is a structural schematic diagram of a single-layer jet regulating valve of the present invention.

In FIG. 3, the valve body (21) of the single-layer jet regulating valve may be designed to be internally composed of a rotatable circular-ring gear (20) and a plurality of cambered thick metal blades (19) overlapping each other. Unfolding and folding of the blades (19) can change the diameter of the central circular hole. Rotation of the circular-ring gear may cause unfolding and folding of the blades to change the diameter of the central circular hole.

The valve body (21) of the single-layer jet regulating valve may also be designed to be internally composed of a plurality of annular metal sheets overlapping each other. The shifting of the annular metal sheets overlapping each other can change the diameter of the central circular hole.

The circular or circular-ring-shaped valve plates (17) or the cambered thick metal blades (19) or the annular metal sheets of the single-layer or multi-layer jet regulating valve (2) cooperate with the pneumatic or electric control inlet valves (4) disposed on the branched water inlet pipes outside the condenser and the master pneumatic control inlet valve (10) disposed on the main water inlet pipe in operation. The operations of the condenser are divided into a plurality of levels for control according to the quantity of water supplied into the water jetting cylinder of the condenser, and the control operations are designed into automatic control or manual control.

Figure 4:
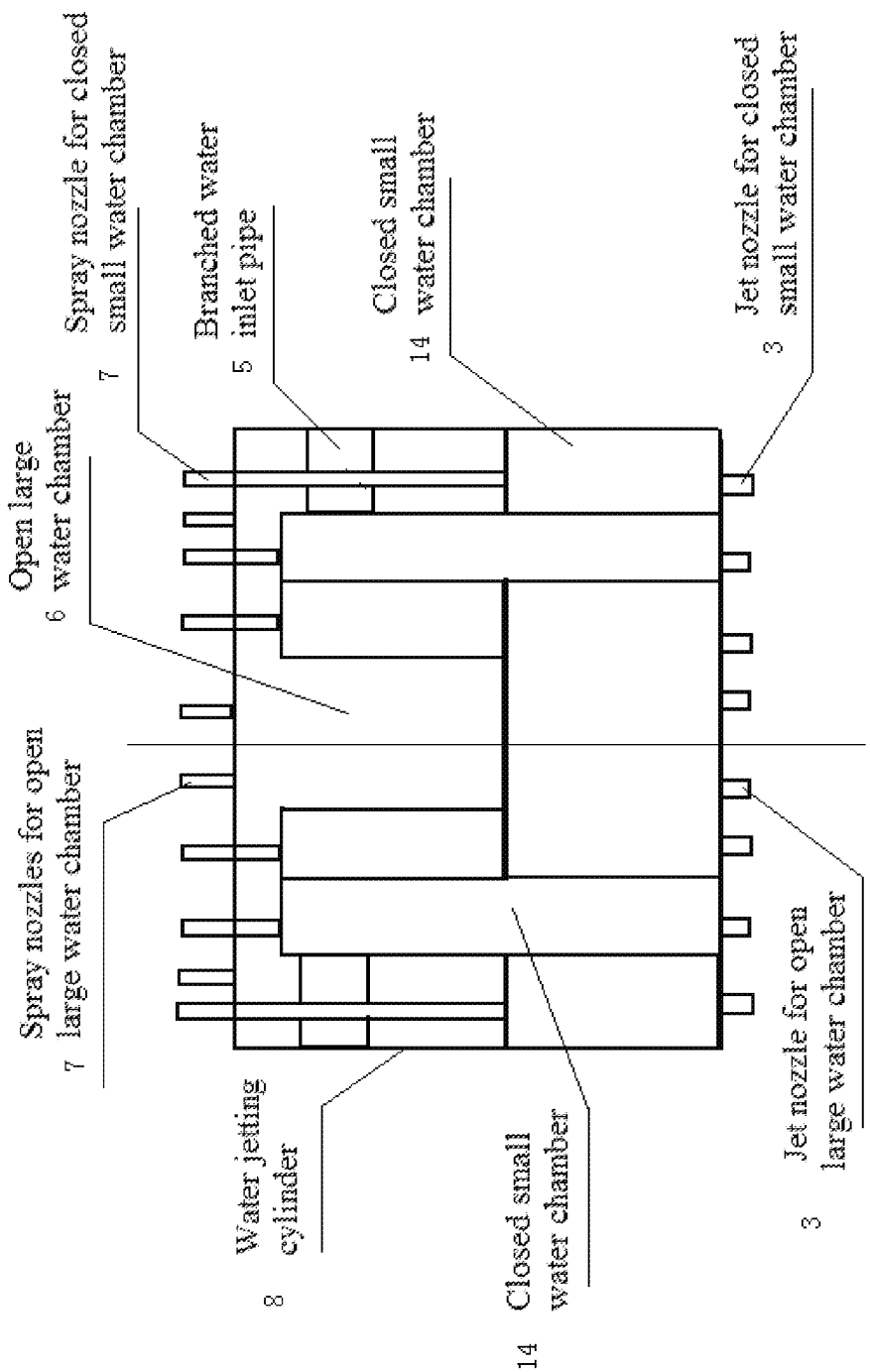
FIG. 4 is a structural schematic diagram of a layout of closed water chambers in a water jetting cylinder (8) of the condenser of the present invention.

FIG. 4 is the structural schematic diagram of the water jetting cylinder (8) of the novel water jet condenser with multiple closed water chambers and the jet regulating valve of the present invention. In FIG. 4, a section view of the body (8) is displayed. Partition plates are disposed on the lower pipe plate within the water jetting cylinder (8) in the figure for division to form the top-open large water chamber (6) and a plurality of top-closed small water chambers (14). A plurality of spray nozzles (7) and a plurality of jet nozzles (3) are disposed on the parts, located in the large water chamber (6), of the upper and lower pipe plates, respectively. A plurality of jet nozzles (3) are also disposed on the part, located in each closed small water chamber (14), of the lower pipe plate. The plurality of spray nozzles (7) on the upper pipe plate are correspondingly connected to the closed small water chambers (14) by means of small water pipes, respectively.

A manhole (15) is formed in the cone bottom of the condenser and above the jet regulating valve (2) to facilitate installation and maintenance of the jet regulating valve (2).

The working principle of the novel water jet condenser with multiple closed water chambers and the jet regulating valve of the present invention is as described below.

At present, various high-efficiency condensers used by domestic and overseas sugar refineries cannot meet the requirements of the changing production conditions due to fixed diameters of the nozzles and the throat. The condenser provided by the present invention allows step-by-step water quantity increase and decrease by means of the plurality of closed small water chambers arranged in the water jetting cylinder under the control of the pneumatic or electric butterfly valves (4), and allows change of the diameter of the central circular hole by means of the single-layer or multi-layer jet regulating valve arranged at the throat; the control on water quantity and the control on the diameter of the hole are reasonably combined to achieve multi-level operations, thus allowing the condenser to meet the requirements of various working conditions and always maintain a high vacuum degree during production.

The invention claimed is:

1. A water jet condenser, comprising:
a single-layer or multi-layer jet regulating valve (2);
a condenser body (13);
a two-layer filter vat (12);
a master pneumatic control inlet valve (10) on a main water inlet pipe (11); and
pneumatic or electric butterfly control inlet valves (4) disposed upon a plurality of branched water inlet pipes (5),
wherein a water jetting cylinder (8) is disposed in the middle of said condenser body (13);
a plurality of spray nozzles (7) jetting upwards are uniformly distributed on an upper pipe plate of said water jetting cylinder (8); and
a plurality of jet nozzles (3) jetting downwards are uniformly distributed on a lower pipe plate of said water jetting cylinder (8);
an inner cavity of said water jetting cylinder (8) is connected to said main water inlet pipe (11) of said two-layer filter vat (12) through a branched water inlet pipe (9);
said main water inlet pipe (11) of said two-layer filter vat (12) is connected to said master pneumatic control inlet valve (10);
said main water inlet pipe (11) of said master pneumatic control inlet valve (10) is connected to a water source; and
said single-layer or multi-layer jet regulating valve (2) is installed upon a conical bottom portion of said condenser body (13), has a lower portion connected to a tail pipe (1), and can be controlled pneumatically, electrically, or manually;
wherein partition plates are disposed on said lower pipe plate of said water jetting cylinder (8) for division to form an open-top large water chamber (6) and a plurality of closed-top small water chambers (14);
wherein said open-top large water chamber (6) is supplied with water from said branched water pipe (9), while said plurality of closed small water chambers (14) are supplied with water from said plurality of branched water inlet pipes (5), respectively;
wherein said plurality of spray nozzles (7) and said plurality of jet nozzles (3) are disposed on parts located within said large water chamber (6) and said small water chambers (14) of said upper and lower pipe plates, respectively; and
wherein water fed into all of said closed small water chambers (14) is controlled by said pneumatic or electric butterfly control valves (4) disposed upon said plurality of branched water inlet pipes (5) outside of said condenser, respectively.

2. The water jet condenser according to claim 1, wherein:
said plurality of spray nozzles located upon said upper part plate are correspondingly connected to said closed small water chambers (14) by means of small water pipes, respectively.

3. The water jet condenser according to claim 1, wherein:
a single-layer jet regulating valve (2) is connected to said conical bottom portion of said condenser body (13);
a valve body (21) of said single-layer jet regulating valve (2) comprises an internal rotatable circular ring gear (20) and a plurality of cambered thick metal blades (19) which overlap whereby unfolding and folding of said blades (19) changes the diameter of a central circular hole defined within said valve body (21); and
rotation of said circular ring gear causes said unfolding and folding of said blades so as to change said diameter of said central circular hole defined within said valve body (21).

4. The water jet condenser according to claim 1, wherein:
a multi-layer jet regulating valve (2), having a valve body (16), is connected to said conical bottom portion of said condenser (13);
2 to 5 layers are incorporated within said valve body (16) of said multi-layer jet regulating valve (2), wherein each layer is separated by a steel plate;
1 to 6 circular or circular ring-shaped valve plates (17), capable of substantially radial movement toward a central portion of said valve body, are arranged within each layer of said valve body (16);
all of said layers of said circular or circular ring-shaped valve plates (17) form a central circular hole with a predetermined diameter; and
each circular or circular ring-shaped valve plate (17) is connected to a push rod (18) extending out of said valve, and said push rod (18) are respectively connected to piston rods of air cylinders and adapted to be pushed by said air cylinders, or are connected to shaft rods of motors and pushed by said motors, or are connected to screws and pushed by gears or are manually pushed so as to vary said diameter of said central circular hole defined within said plates (17).

5. The water jet condenser according to claim 3, wherein:
said valve body (21) of said single-layer jet regulating valve comprises a plurality of internally disposed annular metal sheets which overlap each other, whereby the shifting of said plurality of annular metal sheets can change said diameter of said central circular hole.

* * * * *